United States Patent [19]

Naiman et al.

[11] Patent Number: 4,621,357

[45] Date of Patent: Nov. 4, 1986

[54] TIME DIVISION SWITCHING SYSTEM CONTROL ARRANGEMENT AND METHOD

[75] Inventors: Sheldon Naiman, Elmhurst; Scott W. Pector, Hinsdale, both of Ill.

[73] Assignee: AT&T Bell Laboratories, Murray Hill, N.J.

[21] Appl. No.: 641,449

[22] Filed: Aug. 16, 1984

[51] Int. Cl.[4] .......................................... H04Q 11/04
[52] U.S. Cl. ...................................................... 370/58
[58] Field of Search ................ 370/58, 59; 179/18 ES

[56] References Cited

U.S. PATENT DOCUMENTS

| | | | |
|---|---|---|---|
| 4,038,497 | 7/1977 | Collins et al. | 179/15 |
| 4,296,492 | 10/1981 | Hafer | 370/14 |
| 4,484,323 | 11/1984 | Beuscher et al. | 370/58 |
| 4,484,324 | 11/1984 | Orsic | 370/58 |
| 4,499,575 | 2/1985 | Dupuis et al. | 370/58 |
| 4,520,477 | 5/1985 | Wen | 370/58 |
| 4,530,089 | 7/1985 | Ansell et al. | 370/58 |

OTHER PUBLICATIONS

D. Danielsen et al. "No. 1 ESS Switching Network Frames and Circuits", *The Bell System Technical Journal*, Sep. 1964, pp. 2221–2252.

*Primary Examiner*—Douglas W. Olms
*Assistant Examiner*—Kenneth I. Rokoff
*Attorney, Agent, or Firm*—Kenneth H. Samples

[57] ABSTRACT

A method and arrangement for controlling a time division switching system including a time multiplexed switch is disclosed. The time division switching system comprises a plurality of time-slot interchange units which connect subscriber sets to the input/output ports of a time multiplexed switch. When a connection is to be established between time-slot interchange units, a central control transmits to the time multiplexed switch a path setup message defining the input/output ports to be connected and the time slot to be used for such a connection. The time multiplexed switch controller responds to the path setup messages by disconnecting existing connections through the time multiplexed switch which potentially conflict with the requested connection, then by completing the requested connection. Accordingly, the switching system operates effectively without requiring separate disconnect messages when connections through the time multiplexed switch are no longer needed.

13 Claims, 9 Drawing Figures

TIME DIVISION SWITCHING SYSTEM CONTROL ARRANGEMENT AND METHOD

TECHNICAL FIELD

This invention relates to time division switching systems and more particularly to methods and arrangements for controlling the switch arrangements of such systems.

BACKGROUND OF THE INVENTION

Stored program controlled communication switching systems comprise some form of intelligence which controls switching functions in response to a program stored in memory. Historically, such systems included a single processing entity for the control of the entire system. As technology and system design evolved, it was found desirable to separate certain routine functions from the main processing entity to save its processing time for more complex system functions and decisions. Today, systems are being designed which also separate some of the more complex system functions and decisions into several intelligent processors.

One type of modern time-division switching system comprises a plurality of time-slot interchange units each including a processor, which is selectively interconnected by a time multiplexed switch, sometimes called a time-shared space division switch. Such a switching system also includes a central control arrangement including a processor which determines the pattern of interconnections between the plurality of time-slot interchange units. In order to coordinate the actions of the time-slot interchange unit, the time multiplexed switch, and the central control arrangement, control messages must be exchanged. Since each control message occupies some portion of the interprocessor communication media, too many messages can reduce system real time response by causing delays in message transmission. Similarly, since each message requires processor real time, the individual processors can be kept from needed tasks while receiving and transmitting messages. Accordingly, it is important to minimize the number of control messages exchanged in the system. It is also important, however, that each unit in a distributed processor system have enough information to enable it to properly perform its tasks. This is especially true in distributed telecommunications systems where the integrity of connections must be maintained. Thus, the portions of a distributed communications systems must be designed to operate accurately with a minimum number of required control messages.

An example of the conflict between proper operation and a potentially large number of control messages occurs with communications between the time multiplexed switch and the central control arrangement. The central control and time multiplexed switch must cooperate to complete connections for virtually all calls traversing the switching system. In prior art systems, the central control arrangement, when requested, transmits a message to the time multiplexed switch defining a connection between time-slot interchange units. Then, when the connection is no longer needed (a subscriber goes on-hook), a second message is transmitted directing the time multiplexed switch to clear the connection between the time-slot interchange units. If unused paths through the time multiplexed switch are not cleared, a given input port may eventually be simultaneously connected to a number of output ports and when the given input port is used to complete another connection, signals arriving at that input port may be broadcast to a number of output ports. As discussed above, prior systems transmit two control messages for each time multiplexed switch connection. The first message is used to set up the connection. The second message is then used to remove it. In accordance with the present invention, multiple output port connections to a given input port are substantially avoided without the necessity of disconnect orders, thus reducing substantially the number of control messages exchanged between the central control arrangement and the time multiplexed switch in a time-division switching system. Similar advantages can be obtained in the interactions between time-slot interchange units and the central control.

SUMMARY OF THE INVENTION

A method in accordance with the present invention of controlling connections between input and output ports of a switch arrangement, comprises the steps of storing in a memory arrangement information defining a pattern of connections between the input and output ports, reading from the memory arrangement, and connecting the input ports and output ports in the pattern defined by the information so read, generating a path setup message defining one input port, one output port, and a time-slot, writing into the memory arrangement information defining a pattern of connections in which the input port defined by the path setup message is not connected to any output port during the defined time-slot, and writing into the memory arrangement information defining a pattern of connections in which the input port and output port defined by the path setup message are connected during the defined time-slot.

In accordance with one embodiment of the present invention, a time-shared space division switch is used to interconnect input/output port pairs, each of which includes an input port and an output port. Additionally, the information for controlling the connections through the time-shared space division switch is stored in such a way that the particular input port connected to a given output port during each time-slot can be readily obtained. In response to a path setup message defining a first input/output port pair, a second input/output port pair, and a time-slot, the control unit reads the stored information to determine which input ports are connected to the output ports of the first and second input/output port pairs. The control unit then writes into the memory information which disconnects the input ports found during the read operation from the output ports of the first and second input/output port pairs during the defined time-slot, then information is written into the memory which connects the defined input/output port pairs during the defined time-slot. Since disconnect operations are performed in response to path setup messages, no disconnect messages need be sent to assure that multiple output ports are not connected to a given input port. The avoidance of disconnect messages substantially reduces the message traffic between the time multiplexed switch and the central control arrangement resulting in a savings of system resources.

BRIEF DESCRIPTION OF THE DRAWING

A more complete understanding of the present invention may be obtained from a consideration of the following description when read in conjunction with the drawing in which.

GENERAL DESCRIPTION

Figure 1:
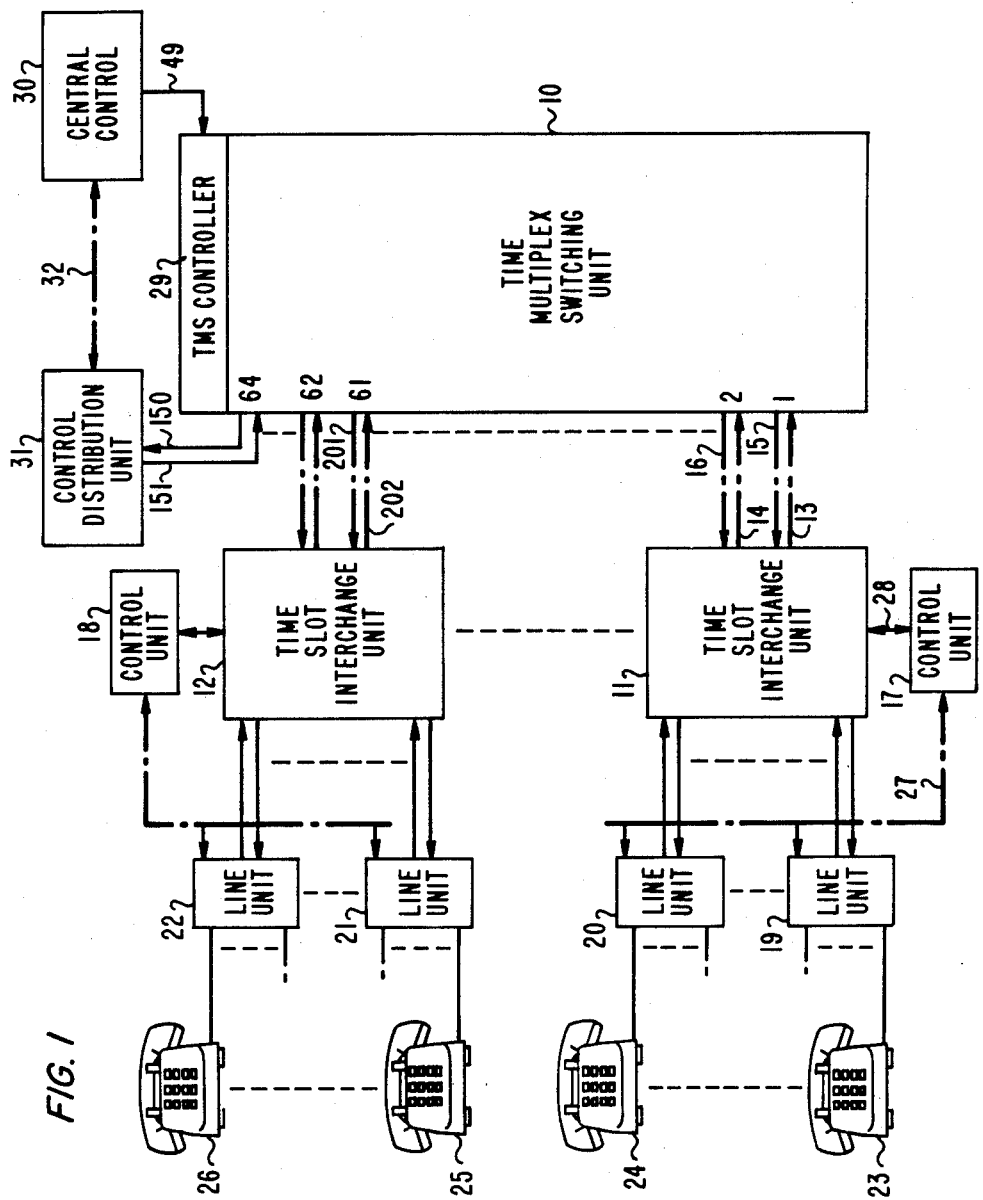
FIG. 1 is a block diagram of a system embodying the present invention.

FIG. 1 is a block diagram of a time-division switching system embodying the present invention which is used to interconnect subscriber sets such as subscriber sets 23 throuqh 26. The embodiment of FIG. 1 includes a time multiplex switching unit 10 which comprises a time-shared space division switch having 64 input ports and 64 output ports. The embodiment further includes 31 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input ports and two output ports of time multiplex switch unit 10. In the present embodiment, time-slot interchange unit 11 is connected to two time multiplex switch input ports via time multiplex lines 13 and 14 and to two output ports, via time multiplex lines 15 and 16.

In the description which follows, the input and output ports of time multiplex switching unit 10 are referred to as input/output port pairs. This term is used since the source for data words to an input port of a given input/output port pair is also the destination for data words from the output port of that pair. As shown in FIG. 1, input/output port pair 1 is associated with time multiplex lines 13 and 15. Each time multiplex line 13 through 16 conveys digital information in 125 microsecond frames each comprising 256 time separated channels. Accordingly, each time-slot interchange unit transmits and receives up to 512 channels of digital information during each 125 microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected to a plurality of line units of which line units 19 through 22 are shown in FIG. 1 via individual time multiplex lines. In the present embodiment line units 19 and 20 are connected to time-slot interchange unit 11 and line units 21 and 22 are connected to time-slot interchange unit 12. Each of the line units of the present embodiment is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time multiplex channels used to transmit the resulting code between the line unit and its associated time-slot interchange unit are determined by the control unit of the associated time-slot interchange unit.

Figure 5:
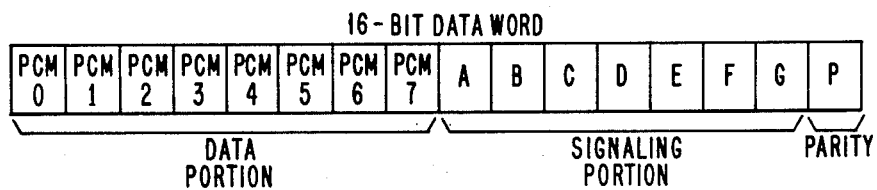
FIG. 5 is a diagram of the data words utilized in the embodiment of FIG. 1.

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. Line unit 19 scans the lines connected to each subscriber set to detect requests for service. When such a request is detected, line unit 19 transmits to the control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. In the present embodiment, line unit 19 also transmits in the assigned channel an indication of the DC state, i.e., open circuit, closed circuit, of the subscriber loop associated with subscriber set 23. Each channel in the present embodiment can convey one 16-bit data word. Each data word (FIG. 5) comprises an 8-bit PCM data portion, a 7-bit signaling portion, and a parity bit. The signaling portion is used to convey signaling information about the channel circuit or the subscriber set to which it is connected. For example, the A-bit of the signaling portion is used to transmit the present DC state of the associated subscriber set to the time-slot interchange unit 11.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11. As previously stated, each time multiplex line between a time-slot interchange unit and the time multiplex switch unit 10 has 256 channels each 125 microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time multiplex line between the time-slot interchange units and the time multiplex switching unit 10 under the control of control units 17 and 18.

Time multiplex switching unit 10 operates in recurring frames of time-slots where each 125 microsecond frame comprises 256 time-slots. During each time-slot, time multiplex switching unit 10 is capable of connecting data words received at any of its 64 input ports to any of its 64 output ports in accordance with time-slot control information stored in a TMS controller 29. The pattern of connections through time multiplex switching unit 10 repeats itself every 256 time-slots and each time-slot is assigned a numerical designation in sequence from 1 to 256. Accordingly, during a first time-slot TS 1 the information in a channel (1) on time multiplex line 13 may be switched by time multiplex switching unit 10 to an output port 64 while during the next time-slot TS 2 the next channel (2) on time multiplex line 13 may be switched to an output port 61. Time-slot control information is transmitted to TMS controller 29 by the central control 30 which derives this control information from control messages obtained from various control units, e.g., 17 and 18.

Central control 30 and the control units 17 and 18 exchange control messages utilizing selected channels called control channels of the time multiplex lines, e.g., 13 through 16, between the time-slot interchange units and the time multiplex switching unit 10. In the present embodiment, each control message comprises a plurality of control words and each control channel can transmit one control word per frame of 256 time separated channels. The same channel of the two time multiplex lines associated with a given input/output port pair is predefined to be a control channel. Additionally, a given channel is used as a control channel for only one pair of time multiplex lines. For example, if channel 1 is used as a control channel on time multiplex line 13 and the associated time multiplex line 15, no other time multiplex line will use channel 1 as a control channel. During each time-slot having the same numerical designation as a control channel, time multiplex switching unit 10 connects the data word occupying that control channel to the 64th output port and connects the 64th input port to the output port associated with the above-mentioned control channel. The following is an example of the operation of the present embodiment when channel 1 is the control channel for time multiplex lines 13 and 15, and channel 2 is the control channel for time multiplex lines 14 and 16. During time-slot TS 1 information in TMS controller 29 defines, among other connections, that the control word in channel 1 of time multiplex line 13 is connected to output port 64 and that the control word in channel 1 at input port 64 is connected to time multiplex line 15. Similarly, during time-slot number TS 2, information in TMS controller 29 defines that the control word in channel 2 of time multiplex line 14 is connected to the output port 64 and that the control word in channel 2 at the input port 64 is connected to time multiplex line 16. When operating in this manner, output port 64 receives from time multiplex switching unit 10 all control words in a channel having the same numerical designation in which they were transmitted to the time multiplex switch. Further, each control channel is connected to receive control words from input port 64 during the time-slot having the same numerical designation as their associated control channel. Control words switched to the 64th output port are transmitted to a control distribution unit 31 which temporarily stores them in a location associated with that control channel. The association of control channels with storage locations in control distribution unit 31 identifies the source of the information stored.

Each control message from a time-slot interchange unit includes a destination portion which uniquely defines the expected destination of the control message. Control distribution unit 31 interprets the destination portion of each control message to determine the proper destination for the control message and retransmits the message to input port 64 of time multiplex switching unit 10 in a channel having the same numerical designation as the control channel associated with the destination unit.

When operating as above described, the time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to the input port 64 during the channel having the same numerical designation as the control channel associated with time-slot interchange unit 12. A control message can also be transmitted to the central control 30 by defining central control 30 in the destination portion of the control message. When this occurs, control distribution unit 31 transmits the message to central control 30 via a communication line 32 rather than returning it to the time multiplex switching unit 10. Similarly, a message may be transmitted from central control 30 to one of the time-slot interchange units by transmitting to the control distribution unit 31 a control message having a destination portion defining the particular time-slot interchange unit. This transmission is also accomplished utilizing communication link 32.

In accordance with the prior example, when a subscriber set goes off-hook, an associated control unit, e.g., 17, collects the dialed digits from that subscriber set. The control unit 17 then creates a control message including representations of the dialed digits, which message is transmitted to central control 30 via the time-multiplex switch 10 and the control distribution unit 31 as described above. Central control 30 responds to the control message from control unit 17 by identifying the time-slot interchange unit, e.g., 12, associated with the dialed digits and a common idle time-slot on one of the time-multiplex lines connecting time-slot interchange unit 12 to the time-multiplex switch 10, and one of the time-multiplex lines connecting the time-slot interchange unit 11 to the time-multiplex switch 10. When the common idle time-slot has been found, central control 30 transmits a path setup message to time-multiplex switch 10 providing the necessary information for time-multiplex switch 10 to connect the input-/output port pairs associated with the selected time-multiplex lines during recurrences of the selected time-slot. Additionally, control messages are exchanged among the central control 30 and the control units 17 and 18 so that the selected time-slot on the selected time-multiplex lines is switched by time-slot interchange units 11 and 12 to the proper subscriber sets. When a time-slot interchange unit is informed of the time-slot for an impending connection, it begins to transmit a logical 1 in the E-bit position (FIG. 5) of each data word transmitted in that time-slot. Further, the time-slot interchange unit waits to receive a logical 1 E-bit in the assigned time-slot from the other time-slot interchange unit. When such logical 1 E-bits are not received within a predetermined period of time or stop after being received, the time-slot interchange unit detecting their absence or termination transmits a control message to central control 30 indicating such. Central control 30 responds to this message by marking the time slot available in a translation table. No message need be sent to time multiplexed switch 10 to release the path for reasons discussed below. After a connection has been established between subscribers, the associated time-slot interchange units continue to check for logical 1 E-bits in the time-slot used for the connection, as well as the on-hook/off-hook status of the associated subscriber sets. When a subscriber set goes on-hook, the associated time-slot interchange unit stops transmitting logical 1 E-bits in the time-slot of the communication, and transmits a control message to central control 30 indicating the completion of the call. Central control 30 responds to call completion messages by marking the time-slot used for the connection as available for use in future connections. A detailed description of the arrangement discussed above can be found in E. H. Hafer U.S. Pat. No. 4,296,492.

Figure 2:
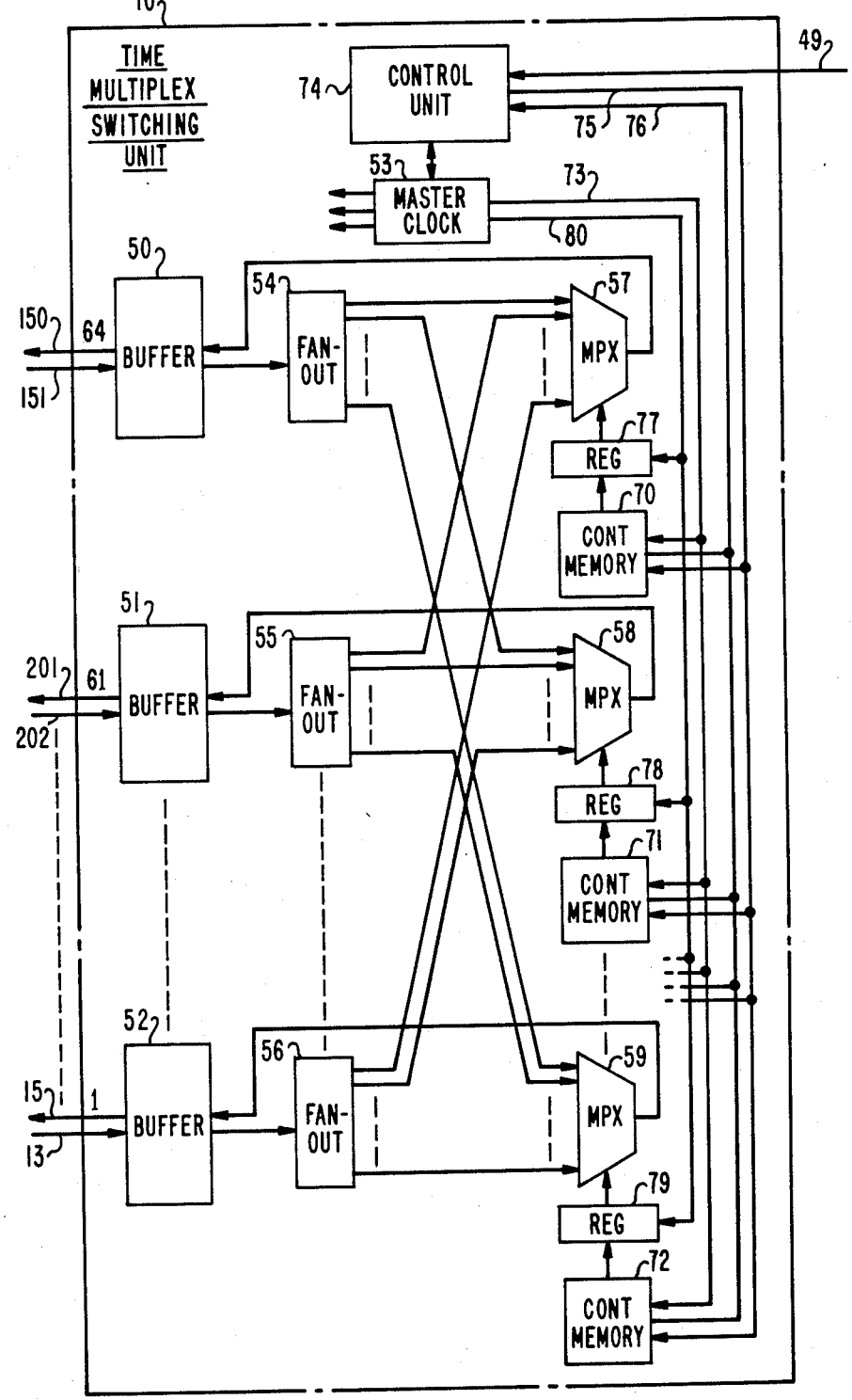
FIG. 2 is a more detailed diagram of a time multiplexed switching unit utilized in the embodiment of FIG. 1.

FIG. 2 is a block diagram of a time-multiplex switch 10 embodying the present invention. Time-multiplex switch 10 includes 64 buffer arrangements, of which buffer arrangement 50 through 52 are specifically shown. Each of the buffer arrangements, e.g., 51, is connected to a time-slot interchange unit, e.g., 12, via a pair of time-multiplex lines, e.g., 201 and 202. Buffer arrangement 50 through 52 receive data words from their associated time-slot interchange unit and synchronize the transmission of those data words to the switch portions of time-multiplex switch 10 under the control of timing signals from a master clock circuit 53. Buffer arrangements 50 through 52 also transmit data words from the switch portion of time-multiplex switch 10 back to their associated time-slot interchange unit. Each buffer arrangement 50 through 52 is connected to a fan-out circuit, e.g., 55. In the present embodiment, buffer arrangements 50, 51, and 52 are connected to fan-out circuits 54, 55, and 56, respectively. A data word received by the buffer arrangement in a given time-slot on its associated time-multiplex line, e.g., 13, is transmitted to the connected fan-out circuit substantially simultaneously with the transmission data words received by other buffer arrangements in the same given time-slot. For example, data words in time-slot 3 of time-multiplex lines 202 and 13 may not be in synchronism due to different lengths of the actual time-multiplex lines themselves. However, buffer arrangements 51 and 52 operate under the control of timing signals from master clock 53 to transmit data words received in time-slot 3 to their associated fan-out circuits 55 and 56 substantially simultaneously. Synchronizing buffers are well-known in the art and an exemplary synchronizing buffer arrangement is described in the previously-mentioned Hafer patent.

Fan-out circuits 54 through 56 each have one input terminal connected to an associate buffer arrangement and 64 output terminals. Fan-out circuits receive data words from their associated buffer arrangements at their input terminal and substantially simultaneously apply those data words to all 64 of their output terminals. Time-multiplex switch 10 further includes 64 multiplex circuits of which multiplex circuits 57 through 59 are specifically shown. Each of the multiplex circuits has 64 input terminals and one output terminal. Multiplexers 57 through 59 operate in synchronism to connect their output terminal to a selected one of their input terminals once each time-slot. The particular input terminal, which is connected to the output terminal of each multiplexer during each time-slot is defined by information stored in an associated control memory. In the present embodiment, control memories 70, 71, and 72 are associated with multiplexers 57, 58, and 59, respectively.

As previously stated, time-multiplex switch 10 operates in repetitive 125-microsecond frames, where each frame comprises 256 time-slots. Further, the pattern of connections between input and output terminals can change once each time-slot. Accordingly, each control memory 70 through 72 comprises 256 addressable storage locations, and one location is associated with each time-slot. The master clock 53 generates a recurring sequence of time slot count signals defining each time-slot in the sequence in synchronism with the time-slots from fan-out circuits 54 through 56. These time-slot count signals are transmitted to control memories 70 through 72 via an address bus 73.

Figure 3:
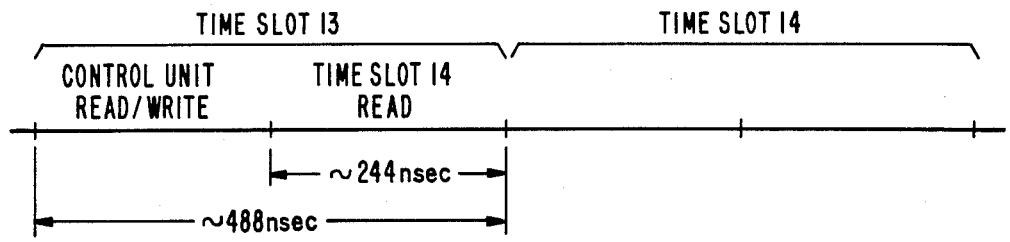
FIG. 3 represents relative timing intervals within the time multiplexed switching unit.

FIG. 3 is a timing diagram representing two consecutive time-slots 13 and 14. Since a given frame has a duration of 125 microseconds and includes 256 time-slots, each individual time-slot is approximately equal to 488 nanoseconds. In the present embodiment, each time-slot is divided approximately in half to yield two time-slot portions of approximately 244 nanoseconds each. The first time-slot portion is used to read or write control memories in order to establish new connections through the time-multiplex switch. This will be described in greater detail later herein. During the second half of each time-slot, control memories are read under the control of master clock circuit 53 by applying time-slot count (address) and control signals to address bus 73. It should be noted that the information read from the control memories during a given time-slot is used to control the multiplexers during next time-slot. Accordingly, as shown in FIG. 3, the second half of time-slot 13 is utilized to read information from the location associated with time-slot 14.

Time-multiplex switch 10, FIG. 2, further includes 64 latch registers of which latch registers 77 through 79 are specifically shown. Each latch register, e.g., 77, is connected to receive the output signals from one control memory, e.g., 70, and is connected to apply control signals to one multiplexer, e.g., 57. At the end of each time-slot, the master clock 53 transmits a control pulse on conductor 80, which is connected to all of the latch registers. The latch registers in response to this control pulse, assume the state of the then current output of their associated control memory and apply this state to the associated multiplexer. The information remains in a given latch circuit until it is again changed at the end of the current time-slot. Each multiplexer, e.g., 59, responds to the information stored in the latch register associated therewith, e.g., 79, to gate a data word at the input defined by the contents of the associated latch to the multiplexer output, and accordingly, to the associated synchronizing buffer arrangement, e.g., 52.

Figure 4:
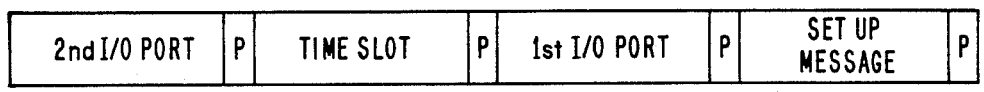
FIG. 4 is a representation of a path setup message exchanged in the embodiment of FIG. 1.

The embodiment of FIG. 2 also includes a control unit 74, which is connected to central control 30 via a transmission bus 49. Control unit 74 responds to commands received from central control 30 to control the operation of time-multiplex switch 10. The control unit 74, the control memories 70 through 72, and the latch registers 77 through 79 comprise the TMS controller 29 of FIG. 1. When central control 30 determines that a new path is to be established between time-slot interchange units, e.g., 11 and 12 (FIG. 1), central control transmits a path setup message (FIG. 4) to control unit 74. Each path setup message comprises four portions, each portion having its own parity bit. A first portion of the path setup message defines that the message is a path setup message. A second portion defines the input/output port pair associated with the first of the subscribers to be connected. A third portion defines the time-slot during which the connection is to be made. The input/output port pair associated with the other subscriber to the connection is defined by the fourth message portion.

Control unit 74 is connected to all control memories 70 through 72 by an address bus 75 and a data bus 76. These buses are used during the first half of each time-slot to read and/or write the control memories to control the connection of input/output port pairs through the time-multiplex switch 10. Each control memory has a unique address corresponding to the input/output port pair associated with that control memory. In order to read or write a given location in a given control memory, control unit 74 transmits the control memory address, the given memory location (the time-slot of interest), and control signals, e.g., read-write enable signals, on address bus 75. When a memory read is performed, the control signals include a read indication, and the specified control memory reads the given location, and transmits that location's contents to control unit 74 on data bus 76. Similarly, when a control memory is to be written, address and control information is transmitted by control unit 74 on address bus 75 while the data to be written is transmitted to the control memory on data bus 76.

The following describes the actions in time-multiplex switch 10 when a path setup message is received by control unit 74. It should be remembered that a completed connection between input/output ports is bidirectional. That is, when a first input/output port pair is connected to a second input/output port pair in one direction, a connection between those input/output port pairs is also established in the reverse direction utilizing the same time-slot. For purposes of this example, it is assumed that central control 30 has received a control message requesting a connection through time-multiplex switch 10 between subscribers connected to time-slot interchange unit 12 and time-slot interchange unit 11. Initially, central control 30 searches a translation table stored in memory and determines that the time-slot 17 is available at input/output port pair 61, which is associated with time-multiplex lines 201 and 202, and at input/output port pair 1, which is associated with time-multiplex lines 13 and 15. Based on this information, central control 30 formulates a path setup message defining input/output port pairs 61 and 1, time slot 17, and that the message is a path setup message. This message is transmitted via bus 49 to control unit 74 which checks parity over all four message portions and determines if the message has the proper syntax. When a path setup message has a parity or syntax error, no further action is taken by control unit 74 and no error message is returned to central control 30. No error message is required due to the previously described E-bit continuity check. Since no connection is established through the time multiplexed switch when a path setup message failure occurs, neither of the time-slot interchange units which were to be connected will receive logical 1 E-bits in the time-slot of the connection. Accordingly, the time-slot interchange units will transmit control messages to the central control 30 indicating a path setup failure and the time-slot in which the failure occurred. Central control 30 responds to those messages by marking the time-slot for the proposed connection as available in the translation table. Although no error message needs to be returned to central control 30 in the present embodiment, it may be desirable to return some type of failure indication so that central control 30 can monitor system performance.

Figure 6:
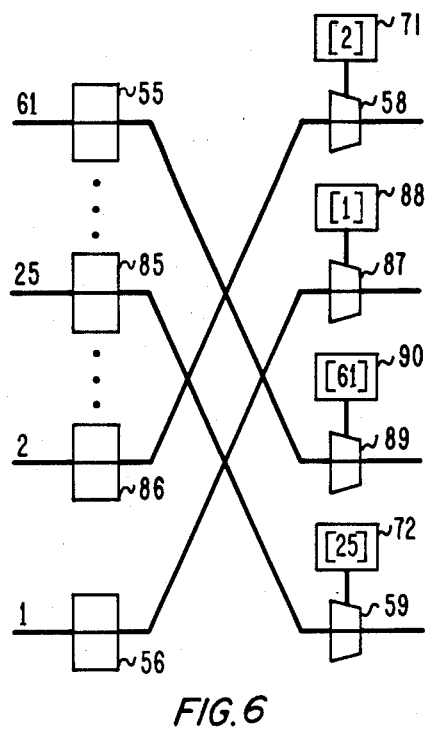
FIGS. 6 through 9 represent a sequence of steps in establishing a path through the time multiplexed switch.

FIGS. 6 through 9 are simplified diagrams of time multiplexed switch 10 and are intended to aid in the understanding of the present invention. FIG. 6 represents a pattern of connections among input/output port pairs 1, 2, 25, and 61, during time-slot 17. The connections shown are currently unused and are merely the remnants of past active connections. The arrangement shown in FIG. 6 includes four multiplexers, 58, 59, 87, and 89, which are respectively associated with control memories 71, 72, 88, and 90. The number drawn in brackets within the control memories represents the information stored in the location associated with time-slot 17 and as such it defines the input port connected to the associated multiplexer output during time-slot 17. For example, the number 1 drawn in control memory 88 represents that the output terminal of multiplexer 87 is connected to the input port of input/output port pair 1 during time-slot 17. It should be noted that in the following example, input/output port pair 63 is unequipped and prior connections are removed by connecting output ports to the input port of input/output port 63. Although in the present example input/output port pair 63 is unequipped, it may be desirable to use it to provide idle code or as a test connection.

Figure 7:
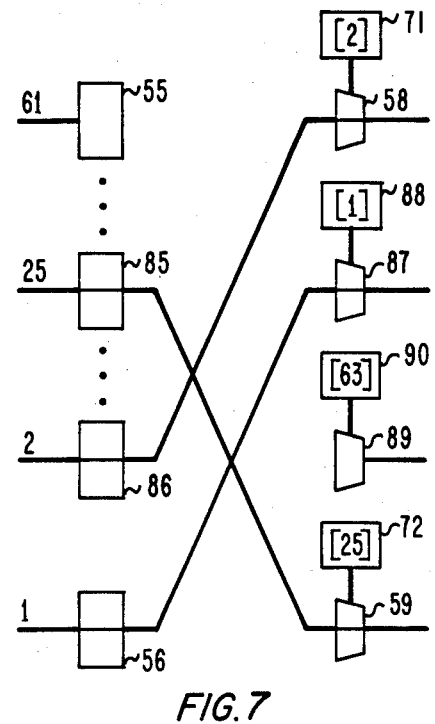
Figure 8:
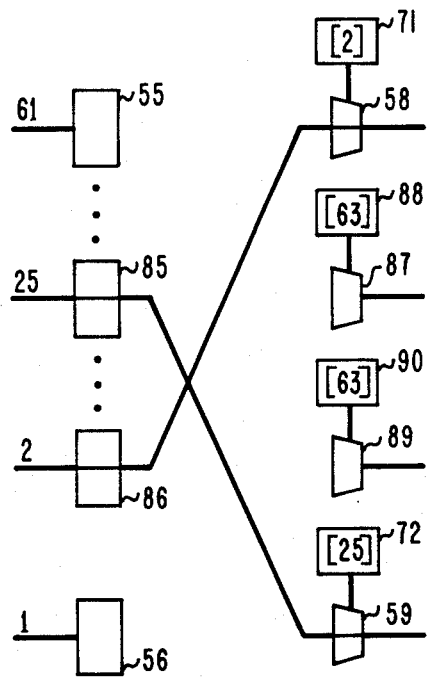

Time-multiplex switch 10 responds to path setup messages by disconnecting other connections to the defined input/output port pairs during the specified time-slot. Accordingly, when control unit 74 receives a valid path setup message defining a connection between input/output port pairs 1 and 61 using time-slot 17, it must first locate and disconnect other possible interfering connections. Initially, control unit 74 reads control memory 71 which is associated with input/output port pair 61 at the address corresponding to time-slot 17. The quantity so read defines which input/output port pair is presently connected to input/output port pair 61 during time-slot 17. In the present example (FIG. 6) input/output port pair 61 is currently connected to input/output port pair 2 during time-slot 17. Since there is a one-to-one correspondence between input/output port pairs and control memories, the quantity so read also defines the control memory associated with the interfering input/output port pair. Accordingly, control unit 74 writes into the control memory 90 associated with input/output port pair 2 at an address corresponding to time-slot 17 the identity of input/output port pair 63. Since input/output port pair 63 is unequipped, this action removes a potentially conflicting connection. FIG. 7 represents the state of time-multiplexed switch 10 after the removal of the first conflicting connection. After clearing the first interfering connection, control unit 74 reads control memory 72 associated with input/output port pair 1 at the address corresponding to time-slot 17. The number 25 shown in control memory 72 (FIG. 6) indicates that input/output port pair 1 is connected to input/output port pair 25 during time-slot 17. The identity of input/output port pair 25 is used as above described to set time-slot 17 in control memory 88 to 63. FIG. 8 represents the status of time-multiplexed switch 10 after writing control memory 88.

Figure 9:
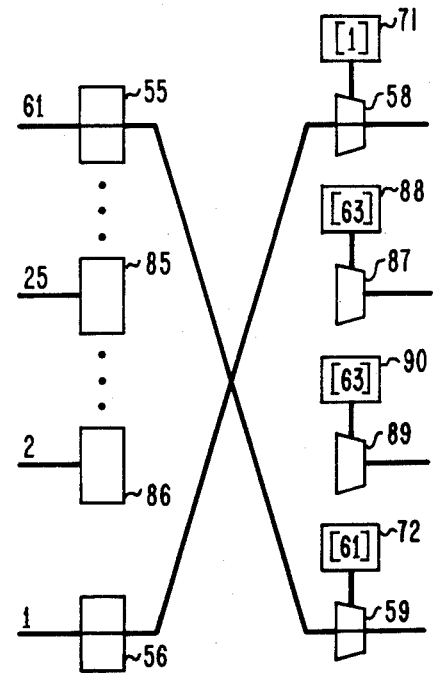

After the interfering connections have been cleared (set to input/output port pair 63), control unit 74 establishes the connections defined by the path setup message. First, control unit 74 writes into control memory 71 which is associated with input/output port pair 61 at the location corresponding to time-slot 17 the quantity defining input/output port pair 1. Accordingly, during subsequent occurrences of time-slot 17, information arriving on time-multiplex line 13 of the input/output port pair 1, is connected to outgoing time-multiplex line 201 via a path comprising buffer arrangement 52, fan-out board 56, multiplexer 58, and a buffer arrangement 51 (FIG. 2). Similarly, control unit 74 writes into control memory 72 at the location corresponding to time-slot 17 the quantity defining input/output port pair 61. During subsequent occurrences of time-slot 17 data words on time-multiplex line 202 of input/output port pair 61 are connected to time-multiplex line 15 of input-/output port pair 1 via a path comprising buffer arrangement 51, fan-out board 55, multiplexer 59, and buffer arrangement 52 (FIG. 2). FIG. 9 represents the status of time-multiplexed switch 10 when the response to the exemplary path setup message is complete. The connection as shown in FIG. 9 continues until some later connection requires the use of either multiplexer 58 or multiplexer 59 during time-slot 17. Even if users of the exemplary time-slot 17 terminate their communication, no disconnect message is sent to disconnect them. Performing disconnect operations as shown and described above substantially reduces the number of messages transmitted in a system and reduces demand on processor of the system.

It is to be understood that the above-described embodiment is merely illustrative of the principles of the invention and that other arrangements may be devised by those skilled in the art without departing from the spirit and scope of the invention. For example, in the preceding description only connections between one input port and one output port are specifically described. The principles of the present invention apply equally well to broadcast connections where one input port is connected to a plurality of output ports. For a broadcast connection the time multiplexed switch, in response to a path setup message, first disconnects possibly conflicting paths for all of the specified output ports and then establishes the requested connection.

Further, the principles of the present invention apply equally well to interactions between time-slot interchange units and a central controller. In this case, the input and output ports are analagous to the time-separated channels entering and leaving the time-slot interchange unit. In response to a path setup message, the time-slot interchange unit controller reads the control memories defining the pattern of connections through the time-slot interchange unit to locate potentially conflicting paths. Based on this information, the controller writes information into the control memories which removes the conflicting paths and which completes the connection requested by the path setup message.

What is claimed is:
1. In combination
   a switch arrangement comprising a plurality of input ports, and a plurality of output ports;
   memory means for storing control information defining a pattern of connections between said input and said output ports;
   means for reading said control information from memory means and for connecting said input and said output ports in accordance with said defined pattern of connections;
   means for generating path setup messages defining a connection between a specified one of said input ports and a specified one of said output ports; and
   control means responsive to said path setup messages for writing into said memory means control information defining a pattern of connections in which no output port is connected to said specified input port and then for writing into said memory means control information defining a pattern of connections in which said specified input port is connected to said specified output port.

2. In combination
   a time-shared space division switch comprising a plurality of input/output port pairs each comprising one input and one output port;
   memory means for storing information defining a plurality of patterns of connections between said input ports and said output ports, each pattern of connections being associated with one of a plurality of time-slots;
   connection control means for periodically reading a pattern of connections from said memory means and for connecting said input and said output ports in accordance with the pattern of connections so read;
   means for generating a path setup message requesting a connection between a first input/output port pair and a second input/output port pair during a defined time-slot; and
   control means responsive to said path setup messages for writing into said memory means information defining a pattern of connections in which no output port is connected to the input ports of said first and said second input/output port pairs during said defined time-slot and then for writing into said memory means information defining a pattern of connections in which the input port of said first input/output port pair is connected to the output port of said second input/output port pair during said defined time-slot and in which the input port of said second input/output port pair is connected to the output port of said first input/output port pair during said defined time-slot.

3. The combination in accordance with claim 2 wherein
   said memory means stores information defining the input port connected to each output port during each time-slot; and
   said control means comprises means responsive to said path setup message for reading said memory means to determine when the output port of said first input/output port pair is connected to the input port of a third input/output port pair during said defined time-slot and for writing into said memory means information defining a pattern of connections which does not connect the output port of said third input/output port pair to the input port of said first input/output port pair during said defined time-slot.

4. The combination in accordance with claim 2 wherein said time-shared space division switch comprises a plurality of multiplexers equal in number to the number of output ports, each of said multiplexers having a plurality of input terminals and one output terminal;

means for connecting each of said input ports to one input terminal of each of said multiplexers;

means for connecting each of said output ports to a unique one of said output terminals; and wherein said memory means comprises a plurality of storage locations, a predetermined number of which are associated with each output port, each storage location defining the input port connected to the associated output port during one time-slot.

5. The combination in accordance with claim 4 wherein the information stored in the storage location associated with the output port of said first input/output port pair for the defined time-slot identifies the input port of a third input/output port pair; and said control means comprises means responsive to said path setup message for reading the information stored in the storage location associated with the output port of said first input/output port pair for said defined time-slot and means, responsive to the identity of said input port of said third input/output port pair read by said means for reading, for writing into the storage location associated with the output port of said third input/output port pair information which does not define the input port of said first input/output port pair.

6. The combination in accordance with claim 5 wherein said connection control means comprises means for generating a sequence of time-slot count signals at the rate of one time-slot count signal per time-slot, each time-slot count signal defining one time-slot;

means operative during each time-slot for reading from said memory means information defining the input ports connected to all of said output ports for the time-slot currently defined by said time-slot count signals; and means for transmitting signals defining the input port connected to each of said output ports to the multiplexers associated therewith.

7. A time division switching system comprising a time-shared space division switch comprising a plurality of input/output port pairs each comprising one input and one output port;

a plurality of time-slot interchange means each connected to at least one of said input/output port pairs;

memory means for storing information defining a plurality of patterns of connections between said input ports and said output ports each pattern of connections being associated with one of a plurality of time-slots;

connection control means for periodically reading a pattern of connections from said memory means and for connecting said input and said output ports in accordance with the pattern of connections so read;

means for generating a path setup message requesting a connection between a first input/output port pair and a second input/output port pair during a defined time-slot; and control means responsive to said path setup messages for writing into said memory means information defining a pattern of connections in which no output port is connected to the input ports of said first and said second input/output port pairs during said defined time-slot and then for writing into said memory means information defining a pattern of connections in which the input port of said first input/output port pair is connected to the output port of said second input/output port pair during said defined time-slot and in which the input port of said second input/output port pair is connected to the output port of said first input/output port pair during said defined time-slot.

8. The time division switching system in accordance with claim 7 wherein said memory means stores information defining the input port connected to each output port during each time-slot; and said control means comprises means responsive to said path setup message for reading said memory means to determine when the output port of said first input/output port pair is connected to the input port of a third input/output port pair during said defined time-slot and for writing into said memory means information defining a pattern of connections which does not connect the output port of said third input/output port pair to the input port of said first input/output port pair during said defined time-slot.

9. The time division switching system in accordance with claim 7 wherein said time-shared space division switch comprises a plurality of multiplexers equal in number to the number of output ports, each of said multiplexers having a plurality of input terminals and one output terminal;

means for connecting each of said input ports to one input terminal of each of said multiplexers;

means for connecting each of said output ports to a unique one of said output terminals; and wherein said memory means comprises a plurality of storage locations, a predetermined number of which are associated with each output port, each storage location defining the input port connected to the associated output port during one time-slot.

10. The time division switching system in accordance with claim 9 wherein the information stored in the storage location associated with the output port of said first input/output port pair for the defined time slot identifies the input port of a third input/output port pair; and said control means comprises means responsive to said path setup message for reading the information stored in the storage location associated with the output port of said first input/output port pair for said defined time-slot and means, responsive to the identity of said input port of said third input/output port pair read by said means for reading, for writing into the storage location associated with the output port of said third input/output port pair information which does not define the input port of said first input/output port pair.

11. The time division switching system in accordance with claim 10 wherein said connection control means comprises means for generating a sequence of time-slot count signals at the rate of one time-slot count signal per time-slot, each time-slot count signal defining one time-slot;

means operative during each time-slot for reading from said memory means information defining the input ports connected to all of said output ports for the time-slot currently defined by said time-slot count signals; and means for transmitting signals defining the input port connected to each of said output ports to the multiplexers associated therewith.

12. The method of controlling connections between the input and output ports of a switch arrangement in time-slots of fixed duration comprising the steps of storing in a memory arrangement information defining patterns of connections between said input and output ports;

periodically reading information from said memory arrangement and connecting said input ports and said output ports in the pattern defined by the information so read;

generating a path setup message defining one input port, one output port, and a time-slot;

writing into said memory arrangement information defining a pattern of connections in which the input port defined by said path setup message is not connected to any output port during the time-slot defined by said path setup message; and after the performance of the preceding writing step writing into said memory arrangement information defining a pattern of connections in which the input and output ports defined by said path setup message are connected during the time-slot defined by said path setup message.

13. In a time division switching system comprising a time-shared space division switch having a plurality of input/output port pairs each input/output port pair comprising one input and one output port, the method comprising the steps of storing in a memory arrangement information defining a plurality of patterns of connections between said input and said output ports, each pattern of connections being associated with one of a plurality of time-slots;

periodically reading a pattern of connections from said memory arrangement and connecting said input ports and said output ports in the pattern of connections defined by the information so read;

generating a path setup message requesting a connection between a first input/output port pair and a second input/output port pair during a defined time-slot;

writing into said memory arrangement information defining a pattern of connections in which no output port is connected to the input ports of said first and said second input/output port pairs during the time-slot defined by said path setup message; and after the performance of the preceding writing step writing into said memory arrangment information defining a pattern of connections in which the input port of said first input/output port pair is connected to the output port of said second input/output port during the time-slot defined by said path setup message and in which the input port of said second input/output port pair is connected to the output port of said first input/output port pair during said defined time-slot.

* * * * *